(12) United States Patent
Kataoka et al.

(10) Patent No.: US 9,304,595 B2
(45) Date of Patent: Apr. 5, 2016

(54) GESTURE-KEYBOARD DECODING USING GESTURE PATH DEVIATION

(71) Applicant: Google Inc., Mountain View, CA (US)

(72) Inventors: Satoshi Kataoka, Tokyo (JP); Keisuke Kuroyanagi, Tokyo (JP)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 13/889,146

(22) Filed: May 7, 2013

(65) Prior Publication Data

US 2014/0115522 A1  Apr. 24, 2014

Related U.S. Application Data

(60) Provisional application No. 61/716,436, filed on Oct. 19, 2012.

(51) Int. Cl.
| | | |
|---|---|---|
| G06F 3/048 | (2013.01) | |
| G06F 3/01 | (2006.01) | |
| G06F 3/023 | (2006.01) | |
| G06F 3/0488 | (2013.01) | |

(52) U.S. Cl.
CPC ............. *G06F 3/017* (2013.01); *G06F 3/0237* (2013.01); *G06F 3/04883* (2013.01); *G06F 3/04886* (2013.01)

(58) Field of Classification Search
CPC ........................... G06F 3/04886; G06F 3/0237
USPC ........................... 715/773, 863; 345/168, 173
See application file for complete search history.

(56) References Cited

U.S. PATENT DOCUMENTS

| | | | |
|---|---|---|---|
| 6,286,064 B1 | 9/2001 | King et al. | |
| 6,292,179 B1 | 9/2001 | Lee | |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |

(Continued)

FOREIGN PATENT DOCUMENTS

WO   2012139266 A1   10/2012

OTHER PUBLICATIONS

U.S. Appl. No. 60/430,338, by Daniel Suraqui, filed Nov. 29, 2002.

(Continued)

*Primary Examiner* — Matthew Ell
(74) *Attorney, Agent, or Firm* — Shumaker & Sieffert, P.A.

(57) ABSTRACT

In one example, a method includes outputting, by a computing device and for display, a graphical keyboard comprising a group of keys. The method may further include receiving an indication of a first portion of a gesture to select a first key, and determining, based at least in part on the first key, one or more predicted next characters. The method may further include determining a path from a first location of the graphical keyboard to a second location of the graphical keyboard, the first location corresponding to the first key, the second location corresponding to one of the one or more predicted next characters. The method may further include comparing a second portion of the gesture with the determined path, and selecting, based at least in part on the comparison, the one of the one or more predicted next characters.

17 Claims, 5 Drawing Sheets

(56) References Cited

U.S. PATENT DOCUMENTS

| | | | |
|---|---|---|---|
| 7,145,554 | B2 | 12/2006 | Bachmann |
| 7,151,530 | B2 | 12/2006 | Roeber et al. |
| 7,199,786 | B2 | 4/2007 | Suraqui |
| 7,250,938 | B2 | 7/2007 | Kirkland et al. |
| 7,251,367 | B2 | 7/2007 | Zhai |
| 7,277,088 | B2 | 10/2007 | Robinson et al. |
| 7,453,439 | B1 * | 11/2008 | Kushler et al. ............... 345/168 |
| 7,508,324 | B2 | 3/2009 | Suraqui |
| 7,706,616 | B2 | 4/2010 | Kristensson et al. |
| 7,716,579 | B2 | 5/2010 | Gunn et al. |
| 7,750,891 | B2 | 7/2010 | Stephanick et al. |
| 7,782,307 | B2 | 8/2010 | Westerman et al. |
| 7,921,361 | B2 | 4/2011 | Gunn et al. |
| 8,036,878 | B2 | 10/2011 | Assadollahi |
| 8,135,582 | B2 | 3/2012 | Suraqui |
| 8,237,681 | B2 | 8/2012 | Stephanick et al. |
| 8,237,682 | B2 | 8/2012 | Stephanick et al. |
| 2006/0119582 | A1 | 6/2006 | Ng et al. |
| 2006/0176283 | A1 | 8/2006 | Suraqui |
| 2008/0316183 | A1 | 12/2008 | Westerman et al. |
| 2009/0007001 | A1 * | 1/2009 | Morin et al. ................... 715/773 |
| 2010/0131447 | A1 * | 5/2010 | Creutz et al. ................... 706/52 |
| 2010/0235794 | A1 | 9/2010 | Ording |
| 2012/0036469 | A1 | 2/2012 | Suraqui |
| 2012/0056818 | A1 | 3/2012 | Shafi et al. |
| 2012/0169619 | A1 | 7/2012 | Golovchenko |
| 2014/0028603 | A1 | 1/2014 | Xie et al. |

OTHER PUBLICATIONS

U.S. Appl. No. 60/505,724, by Daniel Suraqui, filed Sep. 22, 2003.
Natasha Lomas, "Hey Apple, What the Next iPhone Really, Really Needs is a Much Better Keyboard," http://techcrunch.com/2013104/21/the-iphone-keyboard-stinks/?, Apr. 21, 2013, 6 pgs.
Satoshi Kataoka et al., "Density-Based Filtering of Gesture Events Associated with a User Interface of a Computing Device," U.S. Appl. No. 13/750,694, filed Jan. 25, 2013.
International Search Report and Written Opinion of international application No. PCT/US2013/065505, dated Feb. 17, 2014, 11 pp.
International Preliminary Report on Patentability for International Application No. PCT/US2013/065505, mailed Apr. 30, 2015, 8 pp.

* cited by examiner

GESTURE-KEYBOARD DECODING USING GESTURE PATH DEVIATION

This application claims the benefit of U.S. Provisional Application No. 61/716,436, filed Oct. 19, 2012, the entire content of which is hereby incorporated by reference.

BACKGROUND

Some computing devices (e.g., mobile phones, tablet computers, etc.) may provide a graphical keyboard as part of a graphical user interface for composing text (e.g., using a presence-sensitive input device and or display, such as a touchscreen). The graphical keyboard may enable a user of the computing device to enter text (e.g., an e-mail, a text message, or a document, etc.). For instance, a display device of (or operatively coupled to) a computing device may output a graphical (or "soft") keyboard that enables the user to enter data by indicating (e.g., by tapping) keys displayed at the presence-sensitive input device.

Gesture-based keyboards may be used to input text into a computing device, such as a smartphone. Such keyboards may enable a user to input a series of characters using a single gesture. However, gesture-based keyboards may suffer from limitations in accuracy, speed, and inability to adapt to the user. In some examples, a computing device that provides a gesture-based keyboard may include functionality to provide word predictions and/or autocorrections of character strings entered by a user. In some examples, prediction and/or autocorrection accuracy may diminish as the number of characters included in a single gesture increases.

SUMMARY

In one example, a method includes outputting, by a computing device and for display, a graphical keyboard comprising a group of keys. The method further includes receiving, by the computing device, an indication of a first portion of a gesture detected at a presence-sensitive input device, selecting, by the computing device and based at least in part on the first portion of the gesture, a first key from the group of keys of the graphical keyboard, and determining, by the computing device and based at least in part on the first key, one or more predicted next characters. The method further includes determining, by the computing device, a path from a first location of the graphical keyboard to a second location of the graphical keyboard, the first location corresponding to the first key, the second location corresponding to one of the one or more predicted next characters. The method further receiving, by the computing device, an indication of a second portion of the gesture detected at the presence-sensitive input device, comparing, by the computing device, the second portion of the gesture with the determined path from the first location to the second location, and selecting, by the computing device and based at least in part on the comparison, the one of the one or more predicted next characters.

In another example, a computer-readable storage medium is encoded with instructions that, when executed, cause at least one processor of a computing device to output, for display, a graphical keyboard comprising a group of keys, receive an indication of a first portion of a gesture detected at a presence-sensitive input device, select, based at least in part on the first portion of the gesture, a first key from the group of keys of the graphical keyboard, and determine, based at least in part on the first key, one or more predicted next characters. The computer-readable storage medium is further encoded with instructions that, when executed, cause the at least one processor to determine a path from a first location of the graphical keyboard to a second location of the graphical keyboard, the first location corresponding to the first key, the second location corresponding to one of the one or more predicted next characters, receive an indication of a second portion of the gesture detected at the presence-sensitive input device, compare the second portion of the gesture with the determined path from the first location to the second location, and select, based at least in part on the comparison, the one of the one or more predicted next characters.

In another example, a computing system includes at least one processor and a presence-sensitive input device operatively coupled to the at least one processor. The device further includes at least one module operable by the at least one processor to output, for display at the presence-sensitive input device, a graphical keyboard comprising a group of keys, receive an indication of a first portion of a gesture detected at the presence-sensitive input device, select, based at least in part on the first portion of the gesture, a first key from the group of keys of the graphical keyboard, and determine, based at least in part on the first key, one or more predicted next characters. The at least one module is further operable by the at least one processor to determine a path from a first location of the graphical keyboard to a second location of the graphical keyboard, the first location corresponding to the first key, the second location corresponding to one of the one or more predicted next characters, receive an indication of a second portion of the gesture detected at the presence-sensitive input device, compare the second portion of the gesture with the determined path from the first location to the second location, and select, based at least in part on the comparison, the one of the one or more predicted next characters.

The details of one or more examples of the disclosure are set forth in the accompanying drawings and the description below. Other features, objects, and advantages will be apparent from the description and drawings, and from the claims.

DETAILED DESCRIPTION

Figure 1:
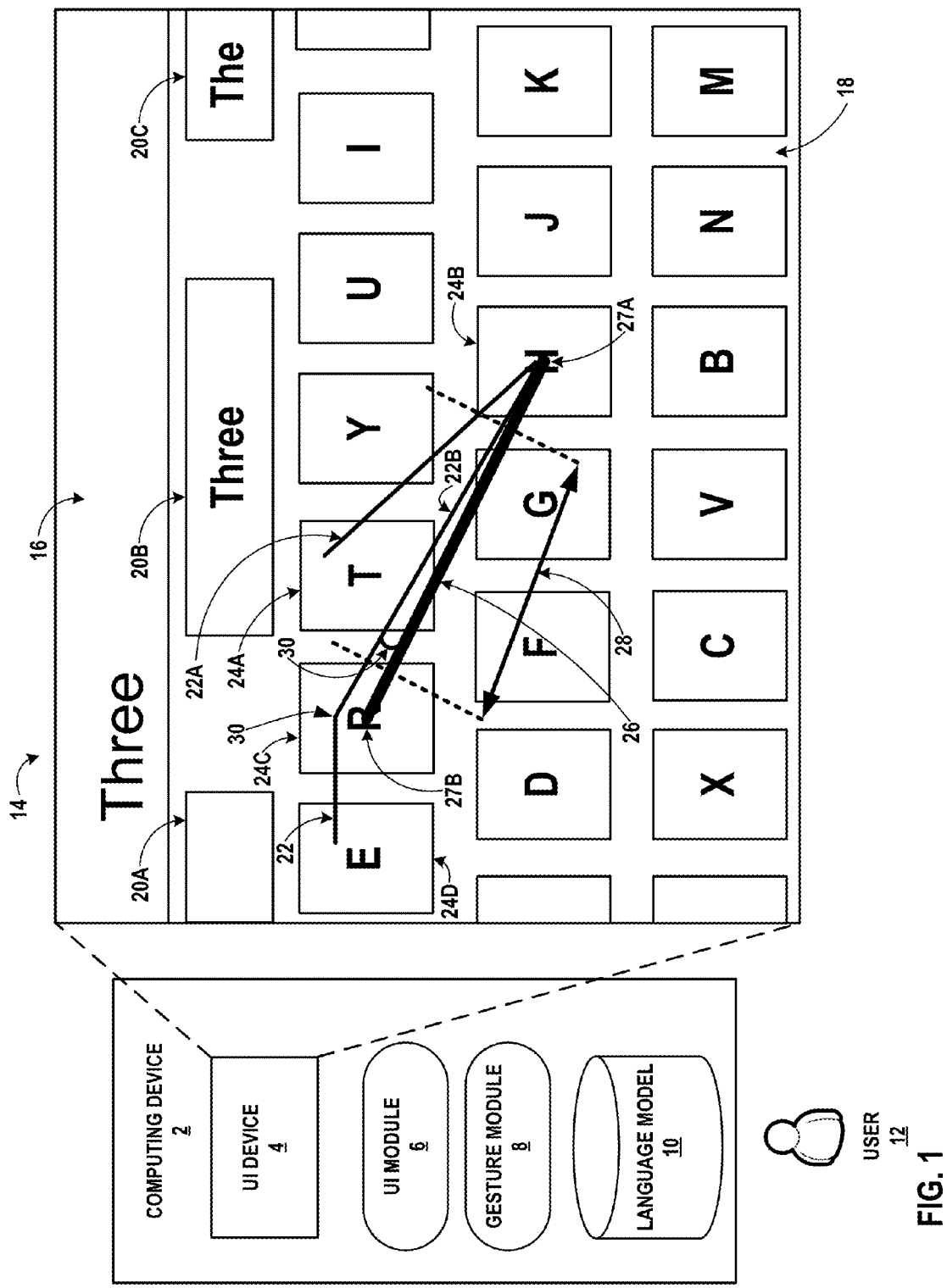
FIG. 1 is a block diagram illustrating an example computing device that may be used to incrementally determine text from a gesture, in accordance with one or more techniques of this disclosure.

In general, this disclosure is directed to techniques for selecting a sequence of characters included in a graphical keyboard by incrementally determining one or more candidate words based on a detected gesture. In some examples, a computing device may output, for display, a graphical keyboard. The computing device may identify input text by detecting user inputs in the form of gestures performed at or near a presence-sensitive input device (e.g., a presence-sensitive and/or touch-sensitive input device, such as a presence-sensitive screen).

For instance, rather than performing multiple discrete gestures to input a single word (e.g., multiple touch gestures, each discrete touch gesture to select a character of the word or phrase), techniques of this disclosure may enable a user to perform a single gesture that indicates the word. As an example, using techniques of this disclosure, a computing device may receive indications of a user performing a continuous motion gesture that indicates a word without removing an input unit used to provide the gesture (e.g., a finger, pen, stylus, and the like) from the presence-sensitive input device. As the computing device receives indications of the user performing the gesture, the computing device may incrementally determine one or more candidate words indicated by the gesture by, for example, searching for one or more points of a gesture that each align with a given keyboard position of a letter (e.g., an alignment point). The search may include selecting a point of the gesture that best aligns with the letter of the keyboard. In certain examples, the search may include determining one or more selected keys of a graphical keyboard based at least in part on a plurality of features of the received gesture input, such as a speed of one or more segments of the gesture, a direction of a segment of the gesture, a curvature of a segment of the gesture, etc.

Based on the search, techniques of the disclosure may enable the computing device to construct one or more probable interpretations for a gesture by traversing both the gesture and various states in a lexicon (e.g., dictionary) in parallel. In this way, techniques of the disclosure can incrementally match the gesture to words in a lexicon trie, one node/letter at a time, using a combination of a spatial gesture model and a language model.

In certain examples, according to various techniques of this disclosure, a computing device may be configured to determine respective physical cost values for each key of the graphical keyboard associated with an interpretation of a gesture detected at the presence-sensitive input device. The respective physical cost values may indicate a probability that an alignment point indicates a key included in the graphical keyboard. Similarly, the computing device may determine respective lexical cost values for each key associated with the interpretation of the gesture. The respective lexical cost values may indicate a probability that a letter represented by the key of the graphical keyboard is included in a candidate word (e.g., a candidate word included in a lexicon, such as the English language). Using the respective physical cost values and lexical cost values, the computing device may determine one or more combined cost values that represent a probability that a received gesture input detected at the presence-sensitive input device indicates a key included in the graphical keyboard. However, in some examples, the computing device may receive an indication of a gesture that traverses keys of the graphical keyboard associated with multiple candidate words included in a lexicon, possibly resulting in multiple interpretations of the gesture. Moreover, in certain examples, a user may provide gesture input to select one or more keys of the graphical keyboard without a substantial change in speed of a segment of the gesture, possibly increasing a difficulty of determining an accurate interpretation of the gesture.

Techniques described herein may improve the accuracy of the incremental determinations using one or more spatial alignment features of the gesture. For instance, according to techniques of this disclosure, a computing device may determine one or more paths from a selected key of a graphical keyboard to one or more predicted next characters. The computing device may compare a portion of a received gesture input to select a next key of the graphical keyboard with one or more of the determined paths from the selected key to the predicted next characters. In certain examples, the computing device may select one of the predicted next characters based at least in part on the comparison. For instance, in some examples, the computing device may determine an angle between the determined path from the selected key to a predicted next key and a portion of a received gesture input to select a next key. In certain examples, in response to determining that the determined angle satisfies a threshold (e.g., is less than, or less than or equal to a threshold number of degrees), the computing device may adjust a physical cost value associated with the predicted next key. For instance, such as in examples where a lower cost value represents an increased likelihood that a received gesture input indicates a key of the graphical keyboard, the computing device may decrease a cost value of a predicted next key in response to determining that the determined angle satisfies the threshold.

In this manner, techniques of this disclosure may improve the accuracy of the incremental determinations of one or more interpretations of a gesture using one or more spatial alignment features of the gesture. Techniques described herein may therefore improve usability of a computing device to enter text using a graphical keyboard.

FIG. 1 is a block diagram illustrating an example computing device 2 that may be used to incrementally determine text from a gesture, in accordance with one or more techniques of this disclosure. In some examples, computing device 2 may be associated with user 12. A user associated with a computing device may interact with the computing device by providing various user inputs into the computing device.

Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc. As shown in the example of FIG. 1, computing device 2 may be a tablet computer. Computing device 2, in some examples, may include user interface (UI) device 4, UI module 6, gesture module 8, and language model 10. Other examples of computing device 2 that implement techniques of this disclosure may include additional components not shown in FIG. 1.

Computing device 2 may include UI device 4. In some examples, UI device 4 may be configured to receive tactile, audio, or visual input. UI device 4, as shown in FIG. 1, may include a touch-sensitive and/or presence-sensitive input device (e.g., touch-sensitive and/or presence-sensitive display) or any other type of device for receiving input. UI device 4 may output content such as graphical user interface (GUI) 14 for display. In the example of FIG. 1, UI device 4 may be a presence-sensitive display that may display a graphical user interface and receive input from user 12 using capacitive, inductive, and/or optical detection at or near the presence-sensitive display.

As shown in FIG. 1, computing device 2 may include UI module 6. UI module 6 may perform one or more functions to receive input, such as user input, and send such input to other components associated with computing device 2, such as gesture module 8. For example, UI module 6 may determine a gesture performed by user 12 at UI device 4. UI module 6 may also receive data from components associated with computing device 2, such as gesture module 8. Using the data, UI module 6 may cause other components associated with computing device 2, such as UI device 4, to provide output based on the data. For instance, UI module 6 may receive data from gesture module 8 that causes UI device 4 to display information at text display region 16 of GUI 14.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes gesture module 8. Gesture module 8 may include functionality to perform a variety of operations on computing device 2, such as functionality to incrementally determine text from a gesture in accordance with the techniques described herein. Gesture module 8 may be implemented in various ways. For example, gesture module 8 may be implemented as a downloadable or pre-installed application or "app." In another example, gesture module 8 may be implemented as part of a hardware unit of computing device 2. In another example, gesture module 8 may be implemented as part of an operating system of computing device 2.

Gesture module 8 may receive data from components associated with computing device 2, such as UI module 6. For instance, gesture module 8 may receive gesture data from UI module 6 that causes gesture module 8 to determine text from the gestured data. In some examples, gesture module 8 determines one or more locations of UI device 4 that are touched or otherwise detected in response to a user gesture, based on information received from UI module 6. In some examples, gesture module 8 can determine one or more features associated with a gesture, such as the Euclidean distance between two alignment points, the length of a gesture path, the direction of a gesture, the curvature of a gesture path, the shape of the gesture, and maximum curvature of a gesture between alignment points, speed of the gesture, etc. Gesture module 8 may also send data to components associated with computing device 2, such as UI module 6. For instance, gesture module 8 may send text determined from the gesture data to UI module 6 that causes UI device 4 to display GUI 14.

As shown in FIG. 1, GUI 14 may be a user interface generated by UI module 6 that allows user 12 to interact with computing device 2. GUI 14 may include graphical content. Graphical content, generally, may include text, images, a group of moving images, etc. As shown in FIG. 1, graphical content may include graphical keyboard 18, text display region 16, and text-suggestion regions 20A-C (collectively "text-suggestion areas 20"). Graphical keyboard 18 may include a group of keys, such as "T" key 24A, "H" key 24B, "R" key 24C, and "E" key 24D. In some examples, each of the group of keys included in graphical keyboard 18 represents a single character. In other examples, one or more of the group of keys included in graphical keyboard 18 represents a group of characters selected based on a plurality of modes.

In some examples, text display region 16 may include characters or other graphical content that are included in, for example, a text-message, a document, an e-mail message, a web browser, and the like. For instance, text display region 16 may include characters or other graphical content that are selected by user 12 via gestures performed at UI device 4. In some examples, text-suggestion regions 20 may each display a candidate word.

UI module 6 may cause UI device 4 to display graphical keyboard 18 and detect a gesture having gesture path 22 that is incrementally determined by gesture module 8 in accordance with techniques described herein. Additionally, UI module 6 may cause UI device 4 to display one or more candidate words determined from the gesture in one or more of text-suggestion regions 20.

Graphical keyboard 18 may be displayed by UI device 4 as an ordered set of selectable keys. Keys may represent a single character from a character set (e.g., letters of the English alphabet), or may represent combinations of characters. Although the example of FIG. 1 provides a zoomed-in illustration of a traditional keyboard (i.e., including fewer selectable keys than a traditional keyboard), one example of graphical keyboard 18 may include a traditional "QWERTY" keyboard layout. Other examples may contain characters for different languages, different character sets, or different character layouts. Similarly, graphical keyboard 18 may include various keys providing other functionality, such as a "?123" or other such keys.

Computing device 2, in some examples, includes language model 10. Language model 10 may include a lexicon. In some examples, a lexicon may include a listing of words and may include additional information about the listed words. A lexicon may be represented by one or more data structures, such as by one or more of an array, a list, a tree, or other data structures. For example, language model 10 may include a lexicon stored in a trie data structure. A lexicon trie data structure may include a plurality of nodes. Each node of the lexicon trie may represent a letter. The first node in a lexicon trie may be considered an entry node, which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag, which indicates that the node is a terminal node. Each terminal node of a lexicon trie may indicate a complete word (e.g., a candidate word) included in the lexicon. The letters indicated by the nodes along a path of nodes from the entry node to a terminal node may spell out a word indicated by the terminal node. In some examples, language model 10 may be a default dictionary installed on computing device 2. In other examples, language model 10 may include multiple sources of lexicons, which may be stored at computing device 2 or stored at one or more remote computing devices that are accessible to computing device 2 via one or more communication channels.

In some examples, language model 10 may be implemented in the firmware of computing device 2. Language model 10 may include language model frequency information such as n-gram language models. An n-gram language model may provide a probability distribution for an item $x_i$ (letter, word, punctuation character or other delimiter) in a contiguous sequence of items based on the previous items in the sequence (i.e., $P(x_i/x_{i-(n-1)}, \ldots, x_{i-1})$). For instance, a bigram language model (an n-gram model where n=2), may provide a probability that the letter "w" follows the sequence of letters "no". In some examples, language model 10 includes a lexicon trie with integrated language model frequency information. For instance, each node of the lexicon trie may include a representation of a letter and a probability value.

Techniques of the present disclosure may improve the speed and accuracy with which a user can enter text into a computing device. Moreover, techniques described herein may improve the accuracy of one or more interpretations of a gesture to select a sequence of characters associated with a group of keys of a graphical keyboard. Using techniques of this disclosure, a computing device may receive an indication of a gesture detected at a presence-sensitive input device to select a group of keys included in a graphical keyboard. Based at least in part on the received gesture, the computing device may incrementally determine one or more predicted next characters. For instance, the computing device may determine one or more predicted next characters based at least in part on language model. The one or more predicted next characters may correspond to characters of one or more candidate words for which the group of selected keys is a prefix.

In certain examples, the computing device may select a predicted next key based at least in part on a comparison between a portion of a gesture detected at the presence-sensitive input device to select a next key of the graphical keyboard and a determined path to a predicted next key. For instance, the computing device may determine that an angle between the detected portion of the gesture and the determined path to the predicted next key is less than a threshold angle (e.g., three degrees, one degree, half of a degree, or other angles). In such an example, the computing device may increase a probability corresponding to the predicted next key associated with a spatial model. By increasing the probability of the predicted next key, the computing device may be more likely to select the predicted next key as the interpretation of the gesture. In such a way, techniques described herein may enable a computing device to improve the accuracy of one or more interpretations of a gesture to select a sequence of characters corresponding to a candidate word included in a lexicon.

As shown in the example of FIG. 1, UI module 6 may output GUI 14 including graphical keyboard 18 for display at UI device 4. UI device 4 (e.g., a presence-sensitive and/or touch-sensitive display) may detect a gesture to select one or more keys of graphical keyboard 18. In one example, the gesture may be a continuous motion gesture that includes a motion of an input unit (e.g., a finger, pen, stylus, etc.) from a first location of UI device 4 to a second location of UI device 4 such that the gesture performed from the first location to the second location is detected by UI device 4 throughout the performance of the gesture. For instance, such as when UI device 4 includes a touch-sensitive display, the gesture may include a motion of an input unit from the first location to the second location with substantially constant contact between the input unit and UI device 4.

As illustrated in the example of FIG. 1, UI device 4 may detect a gesture including gesture path 22 provided by user 12 (e.g., using an input unit such as a finger of user 12). For instance, as illustrated in FIG. 1, UI module 6 may incrementally detect the gesture having gesture path 22 at the presence-sensitive display as user 12 performs the gesture by tracing gesture path 22 through or near keys of graphical keyboard 18 that correspond to the characters of a desired word (e.g., the characters corresponding to the word "three"). UI module 6 may send data that indicates gesture path 22 to gesture module 8. In some examples, UI module 6 incrementally sends data indicating gesture path 22 to gesture module 8 as gesture path 22 is detected by UI device 4 and received by UI module 6. For instance, UI module 6 may send a stream of coordinate pairs indicating gesture path 22 to gesture module 8 as gesture path 22 is detected by UI device 4 and received by UI module 6.

As in the example of FIG. 1, gesture module 8 may receive an indication of gesture path 22 originating at a location of graphical keyboard 18 to select "T" key 24A, the gesture including first portion 22A to select "H" key 24B. Gesture module 8 may determine, based at least in part on the indication of first portion 22A to select "H" key 24B, one or more predicted next characters. As an example, based at least in part on the indication of first portion 22A of gesture path 22, gesture module 8 may determine one or more tokens, each of the tokens including a string of predicted characters indicated by portion 22A. For instance, gesture module 8 may determine a token including the string of characters "th". Each token may be a prefix of one or more words included in the lexicon. As an example, a token including the string of characters "th" may be a prefix of the word "the" included in the lexicon (e.g., the English language). In addition, such a token (i.e., a token including the string of characters "th") may also be a prefix of the word "three" included in the lexicon. Gesture module 8 may determine the one or more predicted next characters corresponding to a next character of the one or more predicted words.

As illustrated in the example of FIG. 1, in response to receiving first portion 22A of gesture path 22, gesture module 8 may determine the one or more predicted next characters to include "R" key 24C (e.g., corresponding to a next character of a predicted word "three") and "E" key 24D (e.g., corresponding to a next character of a predicted word "the"). In some examples, gesture module 8 may determine one or more candidate words based at least in part on the token and a character associated with the predicted next key. A candidate word may be a word suggested to the user that includes a group of characters associated with one or more keys indicated by gesture path 22.

In some examples, gesture module 8 may determine a probability that gesture path 22 indicates a candidate word, and may display one or more of the candidate words at text-suggestion regions 20. In certain examples, gesture module 8 may determine the probability that gesture path 22 indicates a candidate word based at least in part on frequency information associated with the candidate word included in language model 10. For instance, as in the example of FIG. 1, gesture module 8 may determine the candidate words "the" and "three" based on the indication of gesture path 22 and language model 10. In certain examples, language model 10 may include frequency information indicating that one of the candidate words is a more frequently used word of the lexicon. For instance, language model 10 may include frequency information indicating that the candidate word "the" is a more frequently used word in the lexicon than the candidate word "three". In such an example, gesture module 8 may determine that the more frequently used candidate word (i.e., the candidate word "the" in this example) corresponds to a more probable interpretation of gesture path 22.

However, in certain examples, the effects of such frequency information included in language model 10 may tend to outweigh effects of spatial information associated with a gesture. That is, in certain examples, a group of alignment points traversed by gesture path 22 may indicate a key of the group of keys included in graphical keyboard 18. An alignment point may include one or more coordinates corresponding to the determined position of the alignment point (e.g., Cartesian coordinates corresponding to a point on GUI 14). In some examples, gesture module 8 may determine that a group of alignment points traversed by gesture path 22 indicates a key, such as "R" key 24C. In certain examples, a user may attempt to provide such gesture input to select the key (e.g., "R" key 24C), such as by providing gesture input that traverses a portion of graphical keyboard 18 that displays "R" key 24C. In certain examples, computing device 2 may determine a candidate word that does not include the key that most closely corresponds to the group of alignment points (e.g., "R" key 24C), based on the combination of spatial information and frequency information included in language model 10.

Using techniques of this disclosure, gesture module 8 may improve the accuracy of interpretations of a gesture to select a predicted key of a candidate word. For example, as illustrated in FIG. 1, gesture module 8 may receive an indication of first portion 22A of gesture path 22 detected at UI device 4, first portion 22A to select a first key, such as "H" key 24B. Gesture module 8 may determine, based at least in part on the first key (e.g., "H" key 24B in the illustrated example), one or more predicted next characters. For instance, gesture module 8 may determine a predicted next key as "R" key 24C. Similarly, gesture module 8 may also determine a predicted next key as "E" key 24D.

Gesture module 8 may determine a path from a first location of graphical keyboard 18 to a second location of graphical keyboard 18, the first location corresponding to the first key, the second location corresponding to one of the one or more predicted next characters. As in the example of FIG. 1, gesture module 8 may determine path 26 from first location 27A corresponding to "H" key 24B to second location 27B corresponding to "R" key 24C. As illustrated, path 22 may be a straight-line path from the first location 27A corresponding to a centroid of "H" key 24B to a centroid of "R" key 24C. However, in some examples, path 22 may be a curved path. Similarly, while first location 27A and second location 27B are illustrated in FIG. 1 as corresponding to a centroid of an associated key, aspects of this disclosure are not so limited. For instance, one or more of first location 27A and second location 27B may correspond to a corner of an associated key, a top of an associated key, a bottom of an associated key, etc. In general, one or more of first location 27A and second location 27B may each be any location of the presence-sensitive display that corresponds to a unique key of the group of keys of graphical keyboard 18.

In certain examples, gesture module 8 may determine multiple such paths (e.g., multiple paths 26). For instance, gesture module 8 may determine a path from first location 27A to a third location (not illustrated), the third location corresponding to "E" key 24D. That is, in some examples, gesture module 8 may determine a group of paths, each of the paths originating at first location 27A and ending at a location of graphical keyboard 18 corresponding to one of the one or more predicted next characters.

Gesture module 8 may receive an indication of a second portion of the gesture detected at the presence-sensitive display, the second portion of the gesture to select a second key of the group of keys of graphical keyboard 18. For instance, as illustrated, gesture module 8 may receive an indication of second portion 22B of gesture path 22 to select a second key (e.g. "R" key 24C) of graphical keyboard 18. Gesture module 8 may compare the second portion of the gesture with the determined path from the first location to the second location. As an example, gesture module 8 may compare second portion 22B of gesture path 22 with path 26 from first location 27A to second location 27B.

In certain examples, gesture module 8 may compare the second portion of the gesture with the predetermined path from the first location to the second location to determine an indication of an angle between the second portion of the gesture and the predetermined path. For instance, such as in the example of FIG. 1 in which path 26 includes a straight-line path from first location 27A to second location 27B, gesture module 8 may compare second portion 22B with path 26 to determine an indication of angle 30. In some examples, the indication of angle 30 may include direct indications of the angle, such as a number of degrees, a number of radians, and the like. In certain examples, the indication of angle 30 may include indirect indications of the angle, such as a cosine of angle 30, a sine of angle 30, etc.

In certain examples, gesture module 8 may determine, based at least in part on the determined path (e.g., path 26) from the first location (e.g., first location 27A) to the second location (e.g., second location 27B), a calculation region of the presence-sensitive display. As an example, gesture module 8 may determine calculation region 28 that bounds a segment of path 26 from first location 27A to second location 28B by at least one threshold distance. In such examples, gesture module 8 may compare only a segment of second portion 22B of gesture path 22 that is detected within the calculation region with determined path 26. In such a way, gesture module 8 may possibly decrease the effects of curved portions of gesture path 22 on the angular comparison. For instance, in some examples, gesture module 8 may determine one or more locations of portion 22 B that each correspond to a high degree of curvature of portion 22B, such as a first location 27A and location 30. In certain examples, gesture module 8 may determine calculation region 28 as a region that bounds a segment of path 26 from a first location that is a first threshold distance from location 27A to a second location that is a second threshold distance from location 30. The first threshold distance and the second threshold distance may be the same or different distances. In certain examples, one or more of the first threshold distance and the second threshold distance may be a distance that is substantially the same as a width of one or more keys of graphical keyboard 18 (e.g., a width of "H" key 24B).

Gesture module 8 may select, based at least in part on the comparison of the second portion of the gesture with the determined path, one of the one or more predicted next characters. For example, gesture module 8 may compare second portion 22B with path 26 to determine an indication of angle 30. In certain examples, gesture module 8 may compare the indication of angle 30 to a threshold value (e.g., a threshold number of degrees, a threshold number of radians, etc.). In some examples, in response to determining that the indication of angle 30 is less than (or equal to) the threshold value, gesture module 8 may select the predicted next key. For instance, in the example of FIG. 1, gesture module 8 may select predicted "R" key 24C in response to determining that the indication of angle 30 is less than (or equal to) a threshold value, such as two degrees, one degree, half of a degree, or other threshold values. In other examples, as further described below, in response to determining that the indication of angle 30 is less than (or equal to) a threshold value, gesture module 8 may adjust one or more physical and/or lexical cost values associated with the predicted next key.

In such a way, techniques described herein may enable a computing device to select one or more predicted next characters based on a comparison of a path from a selected key to the predicted next key with a portion of a gesture to select a key of the graphical keyboard. In so doing, the techniques may improve the accuracy of the incremental determinations of one or more interpretations of the gesture, thereby improving usability of the computing device to enter text using a graphical keyboard.

Figure 2:
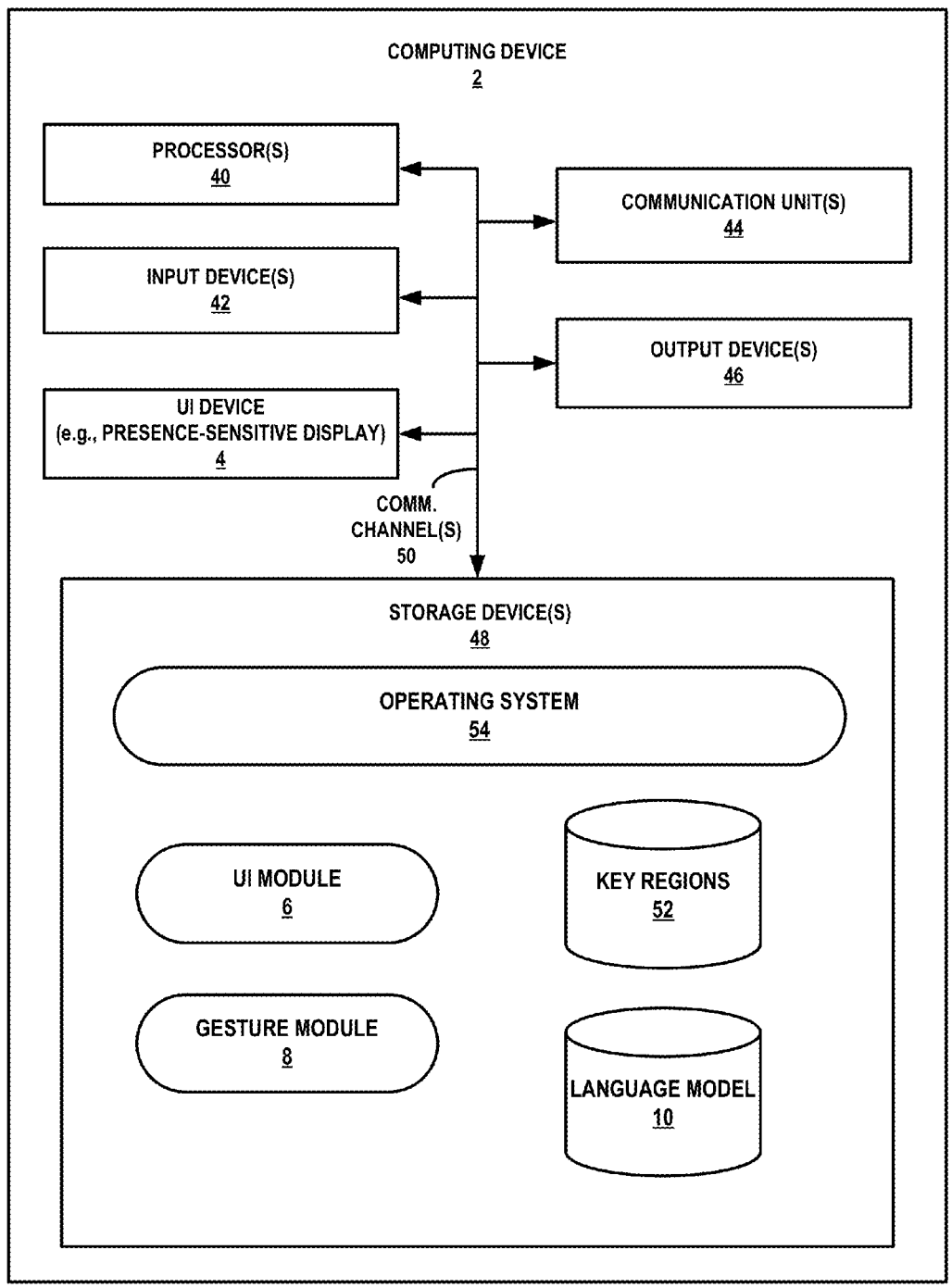
FIG. 2 is a block diagram illustrating further details of one example of a computing device as shown in FIG. 1, in accordance with one or more techniques of this disclosure.

FIG. 2 is a block diagram illustrating further details of one example of a computing device shown in FIG. 1, in accordance with one or more techniques of this disclosure. FIG. 2 illustrates only one particular example of computing device 2 as shown in FIG. 1, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in one example further includes UI module 6, gesture module 8, and operating system 58 that are executable by computing device 2 (e.g., by one or more processors 40). Computing device 2, in one example, further includes language model 10 and key regions 52.

Each of components 4, 40, 42, 44, 46, and 48 may be interconnected (physically, communicatively, and/or operatively) for inter-component communications. In some examples, communication channels 50 may include a system bus, a network connection, an inter-process communication data structure, or any other method for communicating data. As one example in FIG. 2, components 4, 40, 42, 44, 46, and 48 may be coupled by one or more communication channels 50. UI module 6 and gesture module 8 may also communicate information with one another as well as with other components in computing device 2, such as language model 10, and key regions 52.

Processors 40, in one example, are configured to implement functionality and/or process instructions for execution within computing device 2. For example, processors 40 may be capable of processing instructions stored in storage device 48. Examples of processors 40 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., gesture module 8) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video feedback. Examples of input device 42 include a presence-sensitive input device (e.g., a presence-sensitive display), a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

In some examples, UI device 4 may include functionality of input device 42 and/or output device 46. In one example, UI device 4 may be a touch-sensitive screen. In the example of FIG. 2, UI device 4 may be a presence-sensitive display. In some examples, a presence sensitive display may detect an object, such as an input unit (e.g., user's finger, stylus, etc.) at and/or near the screen of the presence-sensitive display. As one example range, a presence-sensitive display may detect a user's finger that is within 2 inches or less of the physical screen of the presence-sensitive display. The presence-sensitive display may determine one or more locations (e.g., (x,y) coordinates) of the presence-sensitive display at which the finger was detected. In another example range, a presence-sensitive display may detect an object 6 inches or less from the physical screen of the presence-sensitive display and other exemplary ranges are also possible. The presence-sensitive display may determine the location of the display selected by a user's finger using capacitive, inductive, and/or optical recognition techniques. In some examples, the presence sensitive display provides output to a user using tactile, audio, or video stimuli as described with respect to output device 46.

Computing device 2 may include operating system 58. Operating system 58, in some examples, controls the operation of components of computing device 2. For example, operating system 58, in one example, facilitates the communication of UI module 6 and/or gesture module 8 with processors 40, communication unit 44, storage device 48, input device 42, and output device 46. UI module 6 and gesture module 8 may each include program instructions and/or data that are executable by computing device 2. As one example, UI module 6 may include instructions that cause computing device 2 to perform one or more of the operations and actions described in the present disclosure.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For example, in some configurations, computing device 2 may not include communication unit 44.

In accordance with the techniques of this disclosure, computing device 2 may output a graphical keyboard comprising a group of keys at output device 46. User 12 may perform a gesture to select a group of keys of the group of keys at input device 42. In response to user 12 performing the gesture, input device 42 may detect a gesture path, such as gesture path 22 of FIG. 1, which may be received by UI module 6 as gesture path data. The gesture path may include a first portion of the gesture to select a first key of the plurality of keys (e.g., portion 22A of gesture path 22) and a second portion of the gesture to select a second key of the plurality of keys (e.g., portion 22B of gesture path 22). Gesture module 8 may receive the gesture path data from UI module 6. In some examples, UI module 6 incrementally sends the gesture path data to gesture module 8 as gesture path 22 is detected by input device 42.

In response to receiving the gesture path data, gesture module 8 may create a token at the entry node of a lexicon which may be included in language model 10. In some examples, language module 10 may be implemented as a trie data structure. Each movable token may represent a partial alignment between a node in the lexicon (i.e., a partial word and/or phrase) and a point along the gesture. As the token advances to child nodes in the lexicon (i.e., next letters in the word and/or next words of a phrase) the corresponding alignment point on the gesture may advance as well. As the token advances to the next letter in a word or to the next word in a phrase, techniques of the disclosure may determine how far the token needs to advance along the gesture path. For instance, techniques of the disclosure may include searching for an alignment point along the gesture that best aligns to a letter of a key, taking into account a number of features described below.

For each token, gesture module 8 may determine, based on a plurality of features associated with the gesture path data, an alignment point traversed by the gesture. In the example of FIG. 1, gesture module 8 may determine that a first alignment point is located at the start of gesture path 22. In some examples, gesture module 8 may determine the curvature of the path at a point along the gesture path. In such examples, gesture module 8 may determine that the point is more likely to be an alignment point where there is a high curvature (where the gesture path changes direction abruptly at the point). In other examples, gesture module 8 may determine a mid-segment curvature (the maximum curvature of the gesture path between two points along the gesture). In another example, gesture module 8 may determine that a point is less likely to be the next alignment point where there is a high mid-segment curvature. In some examples, gesture module 8 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (i.e., a point was missed in-between).

In some examples, an alignment point may be based on the maximum distance between points of a gesture segment between two or more points and an ideal line from a first key to a second key. An ideal line may be, e.g., a shortest distance path from the first key to the second key. For a better alignment the maximum distance may be small, signifying that the gesture segment does not deviate from the ideal line. For each alignment point, gesture module 8 may determine respective cost values for each of at least two keys of the plurality of keys. Each of the respective cost values may represent a probability that the alignment point indicates a key of the plurality of keys.

In some examples, gesture module 8 determines the respective cost values by comparing respective physical cost values with respective lexical cost values. In some examples, gesture module 8 may apply one or more weighting factors to the respective physical cost values, and may apply one or more different weighting factors to the respective lexical cost values. For instance, gesture module 8 may determine a cost value by summing the result of multiplying a physical cost value by a physical weighting factor, and multiplying a lexical cost value by a lexical weighting factor.

In some examples, gesture module 8 may determine that one or more lexical weighting factors applied to the one or more lexical cost values should be greater in magnitude than a magnitude of one or more respective physical weighting factors applied to the one or more physical cost values, such as where the gesture path is detected at high rate of speed. For instance, gesture module 8 may determine that a value associated with a feature (e.g., speed) satisfies one or more thresholds, such as when a global speed of the gesture is greater than or equal to a threshold value, less than or equal to a threshold value, etc. In certain examples, gesture module 8 may determine that the physical cost values are unreliable if the determined value satisfies a threshold.

In some examples, gesture module 8 may use statistical machine learning to adapt to the style of the user and modify the weighting values over time. For instance, gesture module 8 may, in response to determining that the user is inaccurate while performing gestures, weight the lexical cost values greater than the physical cost values. In some examples, gesture module 8 may determine that the physical cost values should be weighted greater than the lexical cost values. Gesture module 8 may determine that the physical cost values should be weighted greater than the lexical cost values where there is an indication that the lexical cost values may be unreliable, such as where the user has a history of entering words not included in the lexicon. In some examples, the weighting values may be estimated and optimized heuristically, such as by measuring accuracy from a plurality of computing devices.

Gesture module 8 may determine respective physical cost values for each of the at least two keys of the plurality of keys. Each of the respective physical cost values may represent a probability that physical features of an alignment point of the group of alignment points indicate physical features of a key of the plurality of keys. For instance, gesture module 8 may determine the respective physical cost values by evaluating the Euclidian distance between an alignment point of the group of alignment points and a keyboard position of key.

Physical features of the plurality of keys may be included in key regions 52. For example, key regions 52 may include, for each of the plurality of keys, a set of coordinates that correspond to a location and/or area of graphical keyboard 16 where each key is displayed. In some examples, gesture module 8 may determine the physical cost values by comparing the Euclidian distance between a first alignment point and a second alignment point with the Euclidian distance between a first letter indicated by the first alignment point and a second letter which may be represented by the second alignment point. Gesture module 8 may determine that the cost value of the second letter is inversely proportional to the difference between the distances (i.e., that the second letter is more probable where the distances are more similar). For instance, a smaller distance may suggest a better alignment.

Gesture module 8 may also determine the respective cost values by determining respective lexical cost values for each of the at least two keys of the plurality of keys. Each of the respective lexical cost values may represent a probability that a letter represented by a key of the plurality of keys is included in a candidate word based on the token. The lexical cost values may be based on language model 10. For instance, the lexical cost values may represent the likelihood that a given letter is selected based on probable words included in language model 10.

In certain examples, gesture module 8 may determine, based at least in part on a plurality of feature associated with a gesture, a group of alignment points traversed by the gesture. Gesture module 8 may determine respective cost values for each of a group of keys of the graphical keyboard. Each of the respective cost values may represent a probability that an alignment point of the group of alignment points indicates a key of the group of keys of the graphical keyboard. For instance, as in the example of FIG. 1, gesture module 8 may receive an indication of a gesture detected at UI device 4 having gesture path 22. Gesture module 8 may determine a group of alignment points traversed by the gesture. In this example, gesture module 8 may determine respective cost values for each of at least "H" 24B, "R" key 24C, and "E" key 24D. Gesture module 8 may determine a first combined cost value based at least in part on the determined cost value for a first key (e.g., "H" key 24B) and the determined cost value for a second key (e.g., "R" key 24C). Similarly, gesture module 8 may determine a second combined cost value based at least in part on the determined cost value for the first key (e.g., "H" key 24B) and the determined cost value for a third key (e.g., "E" key 24D).

In certain examples, gesture module 8 may adjust at least one of the first combined cost value and the second combined cost value based at least in part on a comparison of a portion of the gesture to select a next key of the graphical keyboard with a determined path from a location associated with the first key to a second location associated with one of the second key and the third key. For example, gesture module 8 may determine path 26 from first location 27A corresponding to "H" key 27A to second location 27B corresponding to "R" key 24C. Gesture module 8 may receive an indication of second portion 22B to select "R" key 24C. Gesture module 8 may compare path 26 with second portion 22B, such as by determining angle 30 between path 26 and second portion 22B. In certain examples, gesture module 8 may compare angle 30 to a threshold value, such as a threshold number of degrees (e.g., three degrees, two degrees, one degree, etc.) In some examples, gesture module 8 may determine that angle 30 satisfies the threshold value, such as when angle 30 is less than (or equal to) the threshold value. In response to determining that angle 30 satisfies the threshold value, gesture module 8 may adjust a cost value associated with "R" key 24C. For example, such as when a lower cost value corresponds to an increased probability that an alignment point indicates a key of the graphical keyboard, gesture module 8 may lower the determined cost value associated with "R" key 24C, thereby increasing a probability of an interpretation that gesture path 22 indicates "R" key 24C. In some examples, gesture module 8 may adjust (e.g., increase or decrease) a respective physical cost value associated with "R" key 24C. In this way, techniques of this disclosure may improve the accuracy of the incremental determinations of one or more interpretations of a gesture using one or more spatial alignment features of the gesture.

Figure 3A:
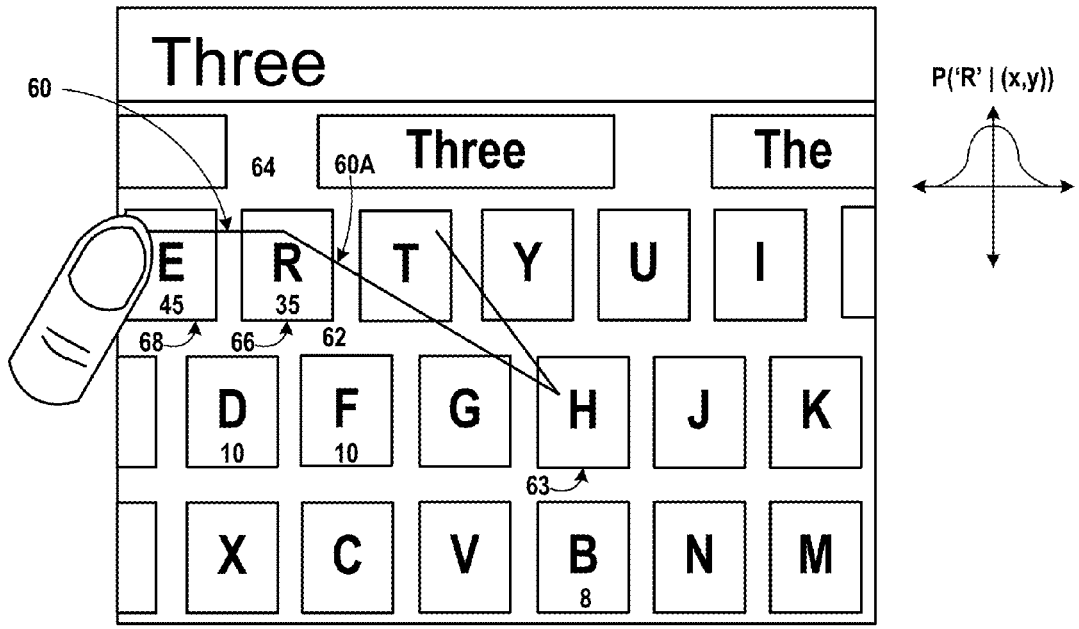
FIGS. 3A-3B are block diagrams illustrating further details of one example of a computing device as shown in FIG. 1, in accordance with one or more techniques of this disclosure.
Figure 3B:
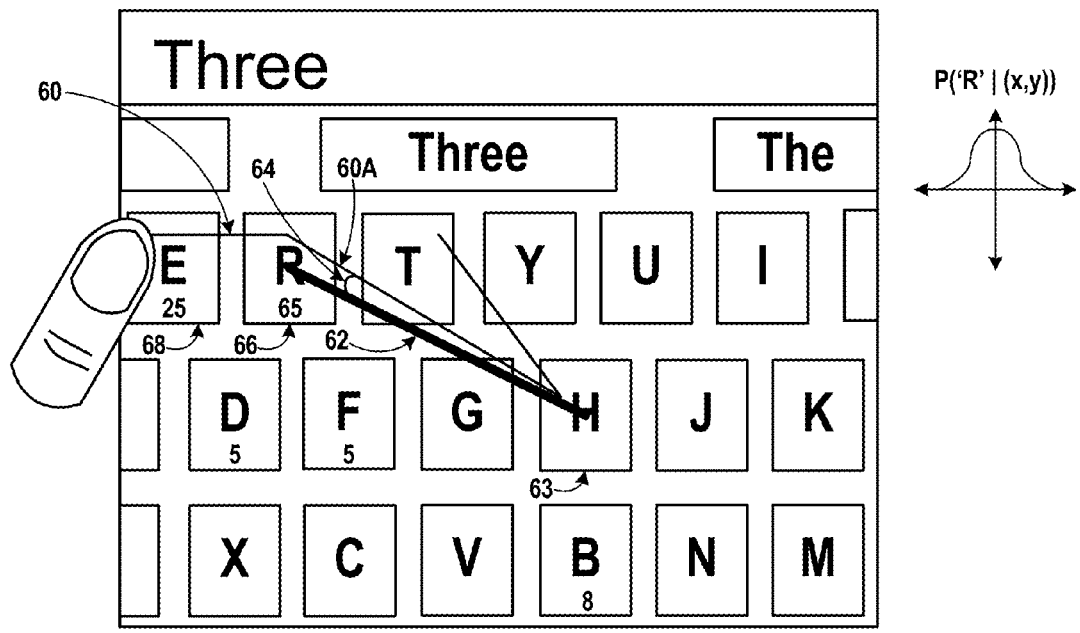

FIGS. 3A-3B are block diagrams illustrating further details of one example of a computing device 2, in accordance with one or more techniques of this disclosure. The examples of FIGS. 3A-3B illustrate an example in which computing device 2 adjusts one or more probabilities associated with one or more keys of a graphical keyboard based at least in part on a comparison of a portion of a received gesture path with a determined path from a selected key to a predicted next key of the graphical keyboard. That is, the example of FIG. 3A illustrates an example of a determined probability that portion 60A of gesture path 60 indicates "R" key 66 prior to adjustment based on a comparison of portion 60A to path 62. FIG. 3B illustrates an example of an adjusted probability that portion 60A of gesture path 60 indicates "R" key 66, the adjusted probability based at least in part on a comparison of portion 60A with path 62.

As illustrated in FIG. 3A, gesture module 8 may receive an indication of a gesture having gesture path 60 detected at UI device 4 (e.g., a presence-sensitive and/or touch-sensitive display). In response to receiving an indication of portion 60A of gesture path 60, gesture module 8 may determine one or more probabilities that portion 60A indicates a key of the graphical keyboard. For instance, as illustrated, gesture module 8 may determine a probability of thirty-five percent that gesture path 60A indicates "R" key 66 and a probability of forty-five percent that gesture path 60A indicates "E" key 68. The probabilities may correspond to one or more cost values associated with each of the predicted keys. For instance, the determined probability of thirty-five percent that gesture path 60A indicates "R" key 66 may correspond to a respective cost value that is higher than a cost value corresponding to the determined probability of forty-five percent that gesture path 60A indicates "E" key 68. That is, each of the determined probabilities may correspond to a respective cost value (e.g., physical cost value, lexical cost value, or combined cost value). Similarly, in certain examples, a lower cost value may correspond to a higher probability.

As illustrated in FIG. 3B, gesture module 8 may determine gesture path 62 from "H" key 63 to "R" key 66. Gesture module 8 may compare portion 60A of gesture path 60 with path 62 to determine angle 64. In certain examples, gesture module 8 may compare angle 64 to a threshold value, such as a threshold number of degrees, radians, and the like. In some examples, such as the illustrated example of FIG. 3B, gesture module 8 may determine that angle 64 satisfies the threshold value. In response, gesture module 8 may adjust one or more probabilities that portion 60A indicates a key of the graphical keyboard.

For instance, as illustrated in FIG. 3B, gesture module 8 may determine, based on the determination that angle 64 satisfies the threshold, an adjusted probability that portion 60A indicates "R" key 66 as sixty-five percent. Similarly, gesture module 8 may determine an adjusted probability that portion 60A indicates "E" key 68 as twenty-five percent. In such a way, computing device 2 may improve the accuracy of the incremental determinations using one or more spatial alignment features of the gesture.

Figure 4:
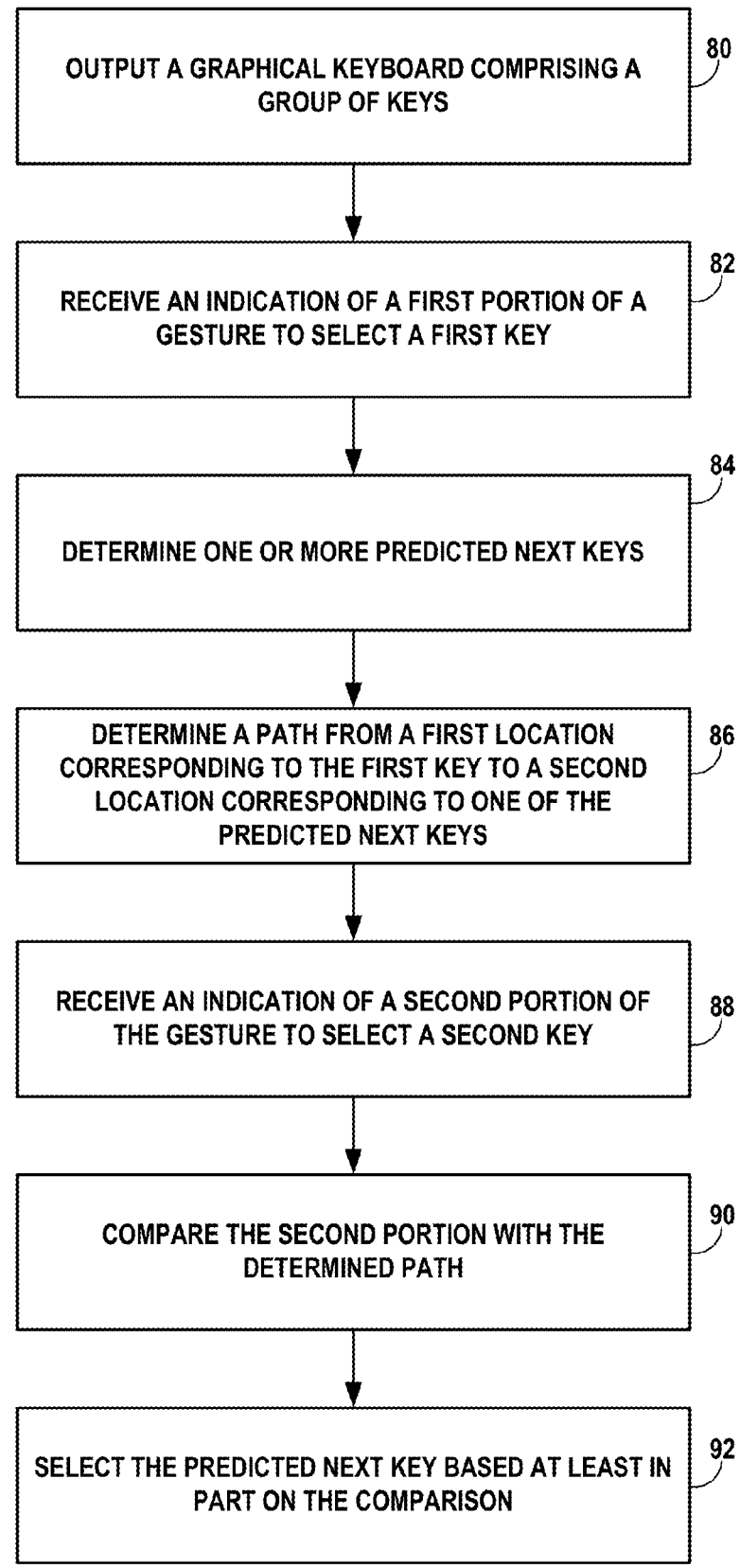
FIG. 4 is a flow diagram illustrating example operations of a computing device to incrementally determine text from a gesture, in accordance with one or more techniques of this disclosure.

FIG. 4 is a flow diagram illustrating example operations of a computing device to incrementally determine text from a gesture, in accordance with one or more techniques of this disclosure. For purposes of illustration only, the example operations are described below within the context of computing device 2, as shown in FIGS. 1 and 2.

In the example of FIG. 4, UI module 6 may output, for display at UI device 4 (e.g., a presence-sensitive display), a graphical keyboard comprising a group of keys (80). For example, UI module 6 may output graphical keyboard 18 including a group of keys, such as "T" key 24A, "H" key 24B, "R" key 24C, and "E" key 24D. Gesture module 8 may receive an indication of a first portion of a gesture detected at the presence-sensitive display, the first portion of the gesture to select a first key of the group of keys (82). For instance, gesture module 8 may receive an indication of firs portion 22A of gesture path 22 detected at UI device 4, first portion 22A to select "H" key 24B of graphical keyboard 18.

Gesture module 8 may determine, based at least in part on the first key, one or more predicted next characters (84). As an example, gesture module 8 may determine the one or more predicted next characters to include "R" key 24C and "E" key 24D. Gesture module 8 may determine a path from a first location of the graphical keyboard to a second location of the graphical keyboard, the first location corresponding to the first key, the second location corresponding to one of the one or more predicted next characters (86). For example, gesture module 8 may determine path 26 from first location 27A corresponding to "H" key 24B to second location 27B corresponding to "R" key 24C. Gesture module 8 may receive an indication of a second portion of the gesture detected at the presence-sensitive display, the second portion of the gesture to select a second key of the group of keys of the graphical keyboard (88). For instance, gesture module 8 may receive an indication of portion 22B of gesture path 22 detected at UI device 4, second portion 22B to select "R" key 24C of graphical keyboard 18.

Gesture module 8 may compare the second portion of the gesture with the determined path from the first location to the second location (90). As an example, gesture module 8 may compare path 26 with portion 22B to determine angle 30. Gesture module 8 may select, based at least in part on the comparison, the one of the one or more predicted keys (92). For instance, gesture module 8 may compare angle 30 with a threshold value, such as a threshold number of degrees, radians, etc. In some examples, gesture module 8 may determine that angle 30 satisfies the threshold value when angle 30 is less than (or equal to) the threshold value. In some examples, gesture module 8 may select "R" key 24C based at least in part on a determination that angle 30 satisfies the threshold value. In certain examples, gesture module 8 may adjust one or more cost values associated with "R" key 24C based at least in part on a determination that angle 30 satisfies the threshold value.

In one example, the determining the path from the first location to the second location comprises determining a straight-line path from the first location to the second location, comparing the second portion of the gesture with the determined path from the first location to the second location comprises comparing the second portion of the gesture with the straight-line path from the first location to the second location to determine an indication of an angle between the second portion of the gesture and the straight-line path from the first location to the second location, and selecting the one of the one or more predicted next characters comprises selecting the one of the group of predicted next characters based at least in part on the determined indication of the angle between the second portion of the gesture and the straight-line path from the first location to the second location.

In one example, determining the indication of the angle between the second portion of the gesture and the straight-line path from the first location to the second location comprises determining a cosine of an angle between the second portion of the gesture and the straight-line path from the first location to the second location. In one example, the operations include determining, by computing device 2, that the determined indication of the angle satisfies a threshold value, wherein selecting the one of the group of predicted next characters comprises selecting the one of the group of predicted next characters based at least in part on the determination that the indication of the angle satisfies the threshold value.

In one example, the first location comprises a centroid of the first key, and the second location comprises a centroid of the one of the one or more predicted next characters. In one example, the operations include determining, by computing device 2 and based at least in part on the determined path from the first location to the second location, a calculation region of the presence-sensitive input device, wherein comparing the second portion of the gesture with the determined path from the first location to the second location comprises comparing a segment of the second portion of the gesture that is detected within the calculation region with the determined path from the first location to the second location. In one example, the calculation region comprises a region of the presence-sensitive input device that bounds a segment of the determined path from the first location to the second location by at least one threshold distance. In one example, determining the one or more predicted next characters further comprises determining the group of predicted next characters based at least in part on a language mode. In one example, the language model comprises an n-gram language model.

In one example, the operations include: determining, by computing device 2 and based at least in part on a plurality of features associated with the gesture, a group of alignment points traversed by the gesture; determining, by computing device 2, respective cost values for each of at least the first key, the second key, and a third key, wherein each of the respective cost values represents a probability that an alignment point of the group of alignment points indicates a key of the group of keys of the graphical keyboard; determining, by computing device 2, a first combined cost value based at least in part on the determined cost value for the first key and the determined cost value for the second key; determining, by computing device 2, a second combined cost value based at least in part on the determined cost value for the first key and the determined cost value for the third key; and adjusting, by computing device 2, at least one of the first combined cost value and the second combined cost value based at least in part on the comparison of the second portion of the gesture with the determined path from the first location to the second location, wherein selecting the one of the one or more predicted next characters further comprises selecting the one of the group of predicted next characters based at least in part on the at least one adjusted first combined cost value and second combined cost value.

In one example, the plurality of features associated with the gesture comprises at least one of: a length of a segment of the gesture, wherein the segment comprises a path traversed by the gesture at the presence-sensitive input device; a direction of the segment of the gesture; a curvature of the segment of the gesture; a local speed that represents a rate at which the segment of the gesture was detected; and a global speed that represents a rate at which the gesture was detected. In one example, determining the respective cost values for each of at least the first key, the second key, and the third key comprises: determining respective physical cost values for each of at least the first key, the second key, and the third key, wherein each of the respective physical cost values represents a probability that at least one physical feature of an alignment point of the group of alignment points indicates at least one physical feature of a key of the group of keys of the graphical keyboard; determining respective lexical cost values for each of at least the first key, the second key, and the third key, wherein each of the respective lexical cost values represents a probability that a letter represented by a key of the group of keys of the graphical keyboard is included in a candidate word; and determining the respective cost values for each of at least the first key, the second key, and the third key based on the respective physical cost values and the respective lexical cost values for each of at least the first key, the second key, and the third key.

In one example, determining the respective physical cost values for each of at least the first key, the second key, and the third key comprises comparing key regions of each of at least the first key, the second key, and the third key with at least one of the plurality of features associated with the gesture, wherein the key regions comprise locations of the presence-sensitive input device that output the respective keys. In one example, determining the respective lexical cost values for each of at least the first key, the second key, and the third key comprises comparing each of at least the first key, the second key, and the third key with a language model.

Figure 5:
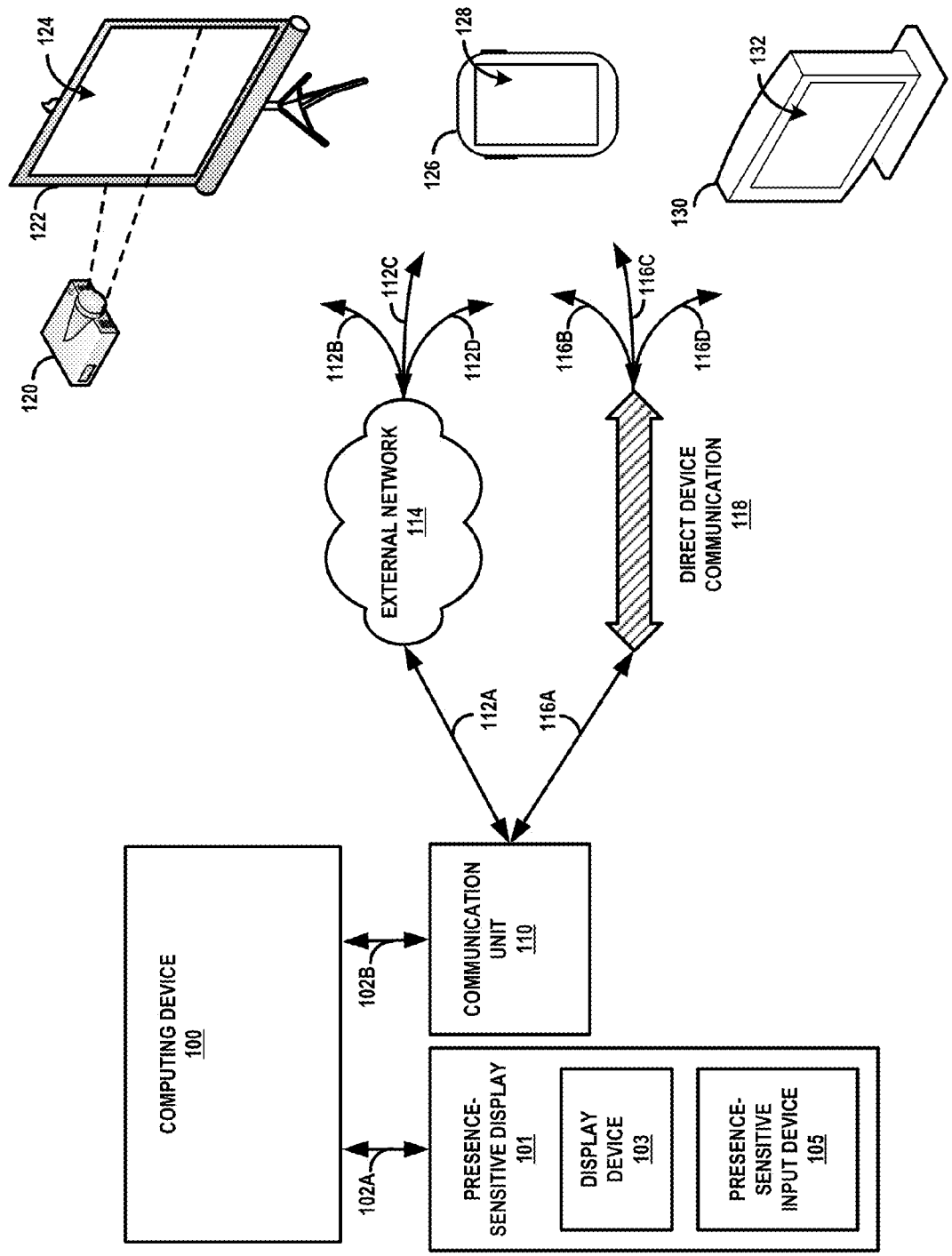
FIG. 5 is a block diagram illustrating an example computing device that outputs graphical content for display at a remote device, in accordance with one or more techniques of the present disclosure.

FIG. 5 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 5 includes a computing device 100, presence-sensitive display 101, communication unit 110, projector 120, projector screen 122, tablet device 126, and visual display device 130. Although shown for purposes of example in FIGS. 1 and 2 as a stand-alone computing device, a computing device may, generally, be any component or system that includes a processor or other suitable computing environment for executing software instructions and, for example, need not include a presence-sensitive display.

As shown in the example of FIG. 5, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 5, computing device 100 may be operatively coupled to presence-sensitive display 101 and communication unit 110 by any number of one or more communication channels.

In other examples, such as illustrated previously in FIGS. 1-2, computing device 100 may be a portable or mobile device such as mobile phones (including smart phones), laptop computers, etc. In some examples, computing device 100 may be a desktop computers, tablet computers, smart television platforms, cameras, personal digital assistants (PDAs), servers, mainframes, etc.

Presence-sensitive display 101, as shown in FIG. 5, may include display device 103 and presence-sensitive input device 105. Display device 103 may, for example, receive data from computing device 100 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed.

As shown in FIG. 5, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 100 may also include and/or be operatively coupled with one or more other devices, e.g., input devices, output devices, memory, storage devices, etc. that are not shown in FIG. 5 for purposes of brevity and illustration.

FIG. 5 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 5 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 5, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, tablet device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, tablet device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 5 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 5. In some examples, network links 112A-112D may be Ethernet, ATM or other network connections. Such connections may be wireless and/or wired connections.

In some examples, computing device 100 may be operatively coupled to one or more of the remote devices included in FIG. 5 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in FIG. 5 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a graphical keyboard for display at presence-sensitive display 132. For instance, computing device 100 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing a first portion of a gesture at presence-sensitive display 132 to select a first key of the keyboard, visual display device 130 may send an indication of the first portion of the gesture to computing device 100 using external network 114. Similarly, in response to a user performing a second portion of a gesture at presence-sensitive display 132 to select a second key of the keyboard, visual display device 130 may send an indication of the second portion of the gesture to computing device 100 using external network 114. Communication unit 110 may receive the indication of the gesture (i.e., including the first portion and the second portion of the gesture), and send the indication to computing device 100.

Computing device 100 may select, based at least in part on the first portion of the gesture, a first key from the group of keys of the graphical keyboard. In some examples, computing device 100 may determine, based at least in part on the first key, one or more predicted next characters. Computing device 100 may determine a path from a first location of the graphical keyboard to a second location of the graphical keyboard, the first location corresponding to the first key, the second location corresponding to one of the one or more predicted next characters. Computing device 100 may compare the second portion of the gesture with the determined path from the first location to the second location, and may select, based at least in part on the comparison, the one of the one or more predicted next characters.

Computing device 100 may send data that includes the selected characters to communication unit 110, which in turn sends the data to visual display device 130 using external network 114. Upon receiving the data, visual display device 130 may cause presence-sensitive display 132 to display the selected characters. In this way, computing device 100 may output the selected characters for display at presence-sensitive screen 132, in accordance with techniques of the disclosure.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   outputting, by a computing device and for display, a graphical keyboard comprising a group of keys;
   receiving, by the computing device, an indication of a first portion of a gesture detected at a presence-sensitive input device;
   selecting, by the computing device and based at least in part on the first portion of the gesture, a first key from the group of keys of the graphical keyboard;
   determining, by the computing device and based at least in part on the first key, one or more predicted next characters;
   determining, by the computing device, a straight-line path from a first location of the graphical keyboard to a second location of the graphical keyboard, the first location corresponding to the first key, the second location corresponding to a key associated with one of the one or more predicted next characters;
   receiving, by the computing device, an indication of a second portion of the gesture detected at the presence-sensitive input device;
   comparing, by the computing device, the second portion of the gesture with the straight-line path from the first location to the second location to determine an indication of an angle between the second portion of the gesture and the straight-line path; and
   selecting, by the computing device and based at least in part on the angle between the second portion of the gesture and the straight-line path from the first location to the second location, the one of the one or more predicted next characters.

2. The method of claim 1, further comprising:
   outputting, by the computing device and for display, at least one candidate word, the at least one candidate word based at least in part on a character associated with the one of the one or more predicted keys.

3. The method of claim 1, wherein determining the indication of the angle between the second portion of the gesture and the straight-line path from the first location to the second location comprises determining a cosine of an angle between the second portion of the gesture and the straight-line path from the first location to the second location.

4. The method of claim 1, further comprising:
   determining, by the computing device, that the determined indication of the angle satisfies a threshold value,
   wherein selecting the one of the group of predicted next characters comprises selecting the one of the group of predicted next characters based at least in part on the determination that the indication of the angle satisfies the threshold value.

5. The method of claim 1, wherein the first location comprises a centroid of the first key, and wherein the second location comprises a centroid of the key of the one of the one or more predicted next characters.

6. The method of claim 1, further comprising:
   determining, by the computing device and based at least in part on the straight-line path from the first location to the second location, a calculation region of the presence-sensitive input device,
   wherein comparing the second portion of the gesture with the straight-line path from the first location to the second location comprises comparing a segment of the second portion of the gesture that is detected within the calculation region with the straight-line path from the first location to the second location.

7. The method of claim 6, wherein the calculation region comprises a region of the presence-sensitive input device that bounds, by at least one threshold distance, a segment of the straight-line path from the first location to the second location.

8. The method of claim 1, wherein determining the one or more predicted next characters further comprises determining the group of predicted next characters based at least in part on a language model.

9. The method of claim 8, wherein the language model comprises an n-gram language model.

10. The method of claim 1, further comprising:
    determining, by the computing device and based at least in part on a plurality of features associated with the gesture, a group of alignment points traversed by the gesture;
    determining, by the computing device, respective cost values for each of at least the first key, the second key, and a third key, wherein each of the respective cost values represents a probability that an alignment point of the group of alignment points indicates a key of the group of keys of the graphical keyboard;
    determining, by the computing device, a first combined cost value based at least in part on the determined cost value for the first key and the determined cost value for the second key;

determining, by the computing device, a second combined cost value based at least in part on the determined cost value for the first key and the determined cost value for the third key; and adjusting, by the computing device and based at least in part on the comparison of the second portion of the gesture with the straight-line path from the first location to the second location, at least one of the first combined cost value and the second combined cost value, wherein selecting the one of the one or more predicted next characters further comprises selecting the one of the group of predicted next characters based at least in part on the at least one adjusted first combined cost value and second combined cost value.

11. The method of 10, wherein the plurality of features associated with the gesture comprises at least one of:

a length of a segment of the gesture, wherein the segment comprises a path traversed by the gesture at the presence-sensitive input device;

a direction of the segment of the gesture;

a curvature of the segment of the gesture;

a local speed that represents a rate at which the segment of the gesture was detected; and a global speed that represents a rate at which the gesture was detected.

12. The method of claim 10, wherein determining the respective cost values for each of at least the first key, the second key, and the third key comprises:

determining, by the computing device, respective physical cost values for each of at least the first key, the second key, and the third key, wherein each of the respective physical cost values represents a probability that at least one physical feature of an alignment point of the group of alignment points indicates at least one physical feature of a key of the group of keys of the graphical keyboard;

determining, by the computing device, respective lexical cost values for each of at least the first key, the second key, and the third key, wherein each of the respective lexical cost values represents a probability that a letter represented by a key of the group of keys of the graphical keyboard is included in a candidate word; and determining, by the computing device and based at least in part on the respective physical cost values and the respective lexical cost values for each of at least the first key, the second key, and the third key, the respective cost values for each of at least the first key, the second key, and the third key.

13. The method of claim 12, wherein determining the respective physical cost values for each of at least the first key, the second key, and the third key comprises comparing key regions of each of at least the first key, the second key, and the third key with at least one of the plurality of features associated with the gesture, wherein the key regions comprise locations of the presence-sensitive input device that output the respective keys.

14. The method of claim 12, wherein determining the respective lexical cost values for each of at least the first key, the second key, and the third key comprises comparing each of at least the first key, the second key, and the third key with a language model.

15. A non-transitory, non-signal computer-readable storage medium encoded with instructions that, when executed, cause at least one processor of a computing device to:

output, for display, a graphical keyboard comprising a group of keys;

receive an indication of a first portion of a gesture detected at a presence-sensitive input device;

select, based at least in part on the first portion of the gesture, a first key from the group of keys of the graphical keyboard;

determine, based at least in part on the first key, one or more predicted next characters;

determine a straight-line path from a first location of the graphical keyboard to a second location of the graphical keyboard, the first location corresponding to the first key, the second location corresponding to a key associated with one of the one or more predicted next characters;

receive an indication of a second portion of the gesture detected at the presence-sensitive input device;

compare the second portion of the gesture with the straight-line path from the first location to the second location to determine an indication of an angle between the second portion of the gesture and the determined straight-line path; and select, based at least in part on the angle between the second portion of the gesture and the straight-line path from the first location to the second location, the one of the one or more predicted next characters.

16. A computing system comprising:

at least one processor;

a presence-sensitive input device operatively coupled to the at least one processor; and at least one module operable by the at least one processor to:

output, for display, a graphical keyboard comprising a group of keys;

receive an indication of a first portion of a gesture detected at a presence-sensitive input device;

select, based at least in part on the first portion of the gesture, a first key from the group of keys of the graphical keyboard;

determine, based at least in part on the first key, one or more predicted next characters;

determine a straight-line path from a first location of the graphical keyboard to a second location of the graphical keyboard, the first location corresponding to the first key, the second location corresponding to a key associated with one of the one or more predicted next characters;

receive an indication of a second portion of the gesture detected at the presence-sensitive input device;

compare the second portion of the gesture with the straight-line path from the first location to the second location to determine an indication of an angle between the second portion of the gesture and the determined straight-line path; and select, based at least in part on the angle between the second portion of the gesture and the straight-line path from the first location to the second location, the one of the one or more predicted next characters.

17. The computing system of claim 16, wherein the at least one module is further operable by the at least one processor to determine that the determined indication of the angle satisfies a threshold value, and wherein the at least one module is operable to select the one of the group of predicted next characters by at least being operable to select the one of the group of predicted next characters based at least in part on the determination that the indication of the angle satisfies the threshold value.

* * * * *